(12) United States Patent
Grote et al.

(10) Patent No.: US 7,174,784 B2
(45) Date of Patent: Feb. 13, 2007

(54) APPARATUS FOR MEASURING A FLUID LEVEL AND METHODS

(75) Inventors: Brandon P. Grote, Cincinnati, OH (US); James E. Kesterman, Cincinnati, OH (US); Eugene E. Schneider, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/757,812

(22) Filed: Jan. 15, 2004

(65) Prior Publication Data
US 2005/0155426 A1 Jul. 21, 2005

(51) Int. Cl.
*G01F 23/42* (2006.01)
(52) U.S. Cl. ........................................ 73/322
(58) Field of Classification Search ............... None
See application file for complete search history.

(56) References Cited

U.S. PATENT DOCUMENTS

| | | | |
|---|---|---|---|
| 219,702 A | 9/1879 | Eckhoff | |
| 1,255,178 A | 2/1918 | Keyzer | |
| 1,696,512 A | 12/1928 | White | |
| 1,918,672 A | 7/1933 | Szabo | |
| 2,511,632 A | 6/1950 | Gregory | |
| 2,600,341 A | 6/1952 | Thompson | |
| 2,713,794 A | 7/1955 | Burns | |
| 2,949,777 A | 8/1960 | Ferron | |
| 3,148,542 A | 9/1964 | Clift | |
| 3,482,447 A | 12/1969 | Bennett | |
| RE27,767 E | 10/1973 | Schoepflin | |
| 4,078,430 A | 3/1978 | Pemberton et al. | |
| 4,092,861 A | 6/1978 | Fling | |
| 4,116,062 A | 9/1978 | Reip | |
| 4,147,060 A | 4/1979 | Fling et al. | |
| 4,244,219 A | 1/1981 | Takahashi | |
| 4,255,859 A | 3/1981 | Klieman | |
| 4,339,950 A | 7/1982 | Lendino | |
| 4,571,998 A | 2/1986 | Stegner | |
| 4,709,653 A | 12/1987 | Salomon | |
| 4,819,484 A | 4/1989 | White | |
| 4,988,978 A | 1/1991 | Soto | |
| 5,144,836 A | 9/1992 | Webb | |
| 5,209,106 A | 5/1993 | Carlin | |
| 5,533,392 A * | 7/1996 | Kira | 73/290 B |
| 6,523,404 B1 * | 2/2003 | Murphy et al. | 73/305 |

FOREIGN PATENT DOCUMENTS

| | | |
|---|---|---|
| GB | 240431 A | 4/1926 |
| GB | 848988 A | 9/1960 |
| GB | 1105118 | 3/1968 |
| JP | 2004340635 A * | 12/2004 |

* cited by examiner

Primary Examiner—Hezron Williams
Assistant Examiner—Paul M. West
(74) Attorney, Agent, or Firm—Dinsmore & Shohl LLP

(57) ABSTRACT

An apparatus for measuring a fluid level includes a housing with a level indicator adapted to display a measured fluid level. A float is associated with the level indicator and an elongated flexible member is provided with a first end and a second end, wherein the first end is attached to the float. The apparatus further includes a spool adapted to store at least a portion of the elongated flexible member, wherein the second end of the elongated flexible member is attached to the spool. A biasing member is adapted to urge the spool to automatically uptake portions of the elongated flexible member as the float travels towards the housing and adapted to allow the elongated flexible member to unwind from the spool as the float travels away from the housing. Additional apparatus include a housing with a level indicator having first and second level indicating gears and a first indexing device adapted to prevent its movement away from one of the indexing gears. The apparatus and a float guide member may be installed on a tank.

35 Claims, 6 Drawing Sheets

APPARATUS FOR MEASURING A FLUID LEVEL AND METHODS

TECHNICAL FIELD

This invention relates generally to apparatus for measuring fluid levels, and more particularly to apparatus for measuring fluid levels in a tank, for example, an above ground storage tank, methods of installing such apparatus, and tank assemblies including such apparatus.

BACKGROUND OF THE INVENTION

It is often desirable to determine a fluid level in a closed reservoir or container. For instance, it is important to determine the fluid level in an above ground tank, often over an extended period of time. Above ground tanks typically have a capped opening at the top of the tank where a conventional dip stick may be inserted for measuring the fluid level. As the capped openings are often positioned some distance off the ground, typically one or several stories above ground, it may be inconvenient and potentially dangerous for an operator to climb up to the capped opening to perform the measurement. Moreover, measuring the fluid level with a conventional dip stick requires removal of the cap, whereby vapors can escape from the interior of the tank. It will be appreciated that this can be a significant disadvantage for tanks which contain fluids of environmental concern, particularly when periodic or repeated measurements are desired. Thus, there is a continuing need for improved apparatus and methods for measuring a fluid level.

SUMMARY OF THE INVENTION

Accordingly, it is an aspect of the present invention to obviate problems and shortcomings of conventional apparatus and methods used to measure a fluid level. More particularly, it is an aspect of the present invention to provide an apparatus for measuring a fluid level in a tank, for example, an above ground tank.

In accordance with one aspect of the invention, an apparatus is provided. The apparatus is for measuring a fluid level in a tank with a tank opening and a float guide member adapted to engage a tank opening. The apparatus includes a housing with a level indicator adapted to display a measured fluid level. A float is associated with the level indicator and an elongated flexible member is provided with a first end and a second end, wherein the first end is attached to the float. The apparatus further includes a spool adapted to store at least a portion of the elongated flexible member, wherein the second end of the elongated flexible member is attached to the spool. A biasing member is adapted to urge the spool to automatically uptake portions of the elongated flexible member as the float travels towards the housing and adapted to allow the elongated flexible member to unwind from the spool as the float travels away from the housing. Still further, the apparatus includes a mounting device attached to the housing. The mounting device includes an interior passageway, wherein a length of the elongated flexible member is adapted to extend through the interior passageway. The mounting device is adapted to attach to a tank opening after a separate float guide member is engaged with the tank opening.

In accordance with another aspect of the invention, a tank assembly is provided. The tank assembly comprises a tank including a tank opening and a tank interior in communication with the tank opening. The tank assembly further includes a float guide member with a first end portion engaging the tank opening and a second end portion positioned within the tank interior. The tank assembly also includes an apparatus for measuring a fluid level comprising a housing including a level indicator adapted to display a measured fluid level, a float associated with the level indicator, and an elongated flexible member having a first end and a second end, wherein the first end is attached to the float. The apparatus further includes a spool adapted to store at least a portion of the elongated flexible member, wherein the second end of the elongated flexible member is attached to the spool. A biasing member is adapted to urge the spool to automatically uptake portions of the elongated flexible member as the float travels towards the housing and adapted to allow the elongated flexible member to unwind from the spool as the float travels away from the housing. The tank assembly further includes a mounting device attached to the housing with an interior passageway. A length of the elongated flexible member is adapted to extend through the interior passageway and the mounting device is attached to the tank opening.

In accordance with still another aspect of the invention, a further apparatus for measuring a fluid level in a tank is provided. The apparatus includes a housing with a level indicator adapted to display a measured fluid level. The level indicator includes a first level indicating gear, a second level indicating gear, and a first indexing device adapted to facilitate an incremental rotation of the second level indicating gear based on a rotation of the first level indicating gear. The first indexing device is adapted to interact with a first corresponding level indicating gear comprising one of the first level indicating gear and the second level indicating gear to substantially prevent movement of the first indexing device away from the first corresponding level indicating gear. The apparatus further includes a float associated with the level indicator, an elongated flexible member having a first end and a second end, wherein the first end is attached to the float, and a spool adapted to store at least a portion of the elongated flexible member. The second end of the elongated flexible member is attached to the spool. The apparatus still further includes a biasing member adapted to urge the spool to automatically uptake portions of the elongated flexible member as the float travels towards the housing and adapted to allow the elongated flexible member to unwind from the spool as the float travels away from the housing.

In accordance with yet additional aspects of the present invention, a method of installing an apparatus for measuring a fluid level and a float guide member to a tank is provided. The tank includes a tank interior and a tank opening in communication with the tank interior. The float guide member includes a first end portion and a second end portion. The apparatus includes a housing with a level indicator adapted to display a measured fluid level, a float associated with the level indicator, and an elongated flexible member having a first end and a second end, wherein the first end is attached to the float. The apparatus further includes a spool adapted to store at least a portion of the elongated flexible member, the second end of the elongated flexible member being attached to the spool. A biasing member is adapted to urge the spool to automatically uptake portions of the elongated flexible member as the float travels towards the housing and adapted to allow the elongated flexible member to unwind from the spool as the float travels away from the housing. The apparatus further includes a mounting device attached to the housing and including an interior passageway, wherein a length of the elongated flexible member is adapted to extend through the interior passageway. The method comprises the steps of: inserting the second end portion of the float guide member through the tank opening and into the tank interior until the first end portion of the float guide member engages the tank opening, associating the float with the float guide member, and attaching the mounting device of the apparatus to the tank opening after the first end portion of the float guide member is engaged with the tank opening.

The fluid measuring apparatus and methods of the present invention are advantageous in that they facilitate fluid level measurements in a tank, for example an above ground storage tank. Still other advantages of the present invention will become apparent to those skilled in the art from the following description wherein there are shown and described alternative exemplary embodiments of this invention. As will be realized, the invention is capable of other different, obvious aspects and embodiments, all without departing from the invention. Accordingly, the drawings and descriptions should be regarded as illustrative in nature and not as restrictive.

BRIEF DESCRIPTION OF THE DRAWINGS

While the specification concludes with claims particularly pointing out and distinctly claiming the present invention, it is believed that the claims will be better understood from the following description taken in conjunction with the accompanying drawings in which:

DETAILED DESCRIPTION OF EXEMPLARY EMBODIMENTS

Figure 10:
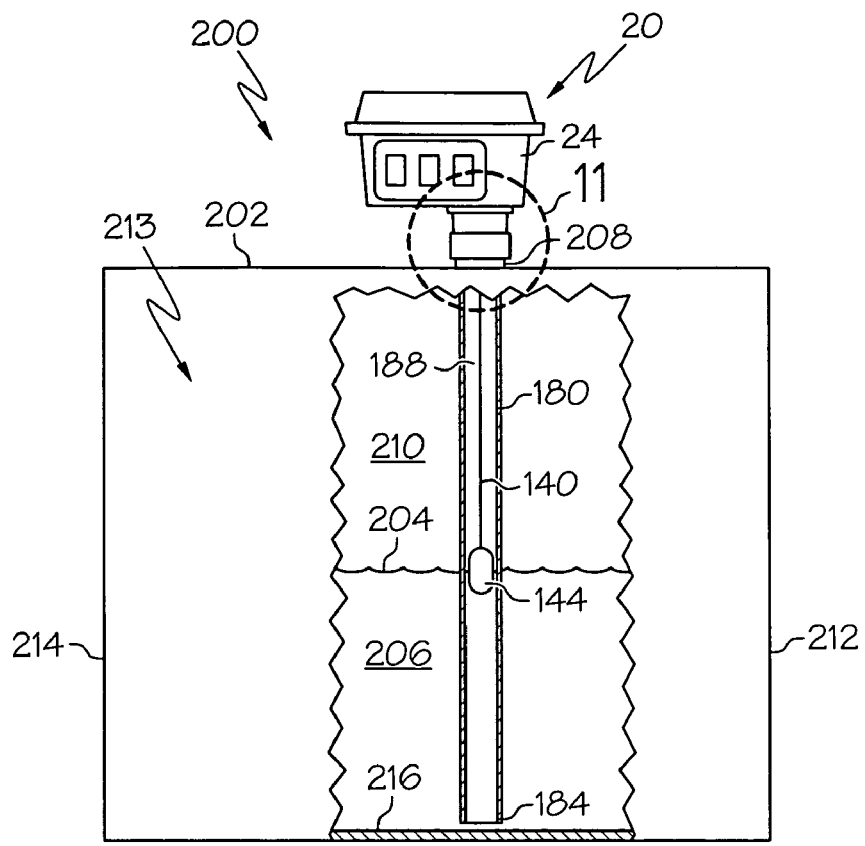
FIG. 10 is a front elevational view of an exemplary tank assembly incorporating the apparatus of FIGS. 1–9, wherein a portion of the front side of the tank is broken away to reveal a partial sectional view of a float guide member and float disposed with respect to the float guide member.

Exemplary embodiments of the invention are directed to apparatus for measuring a fluid level. Exemplary conventional fluid level apparatus and methods are disclosed by U.S. Pat. No. 6,523,404 to Murphy et al., the entire disclosure which is herein incorporated by reference. It will be appreciated that inventive concepts of the present invention may be used with various structures, features (e.g., types of materials) and/or combinations thereof that are disclosed by U.S. Pat. No. 6,523,404 to Murphy et al. Apparatus for measuring a fluid level and methods can be particularly advantageous for use with tanks and the like. As shown in FIG. 10, for example, a tank assembly 200 is provided by mounting a fluid level measuring apparatus 20 to a tank 202 for measuring a fluid level therein. While exemplary embodiments of the inventions are described with application to above-ground tanks, one skilled in the art will appreciate that the fluid level measuring apparatus and methods described herein may be used, without limitation, in other tanks and tank assemblies and in a variety of different environments in addition to tanks.

Figure 1:
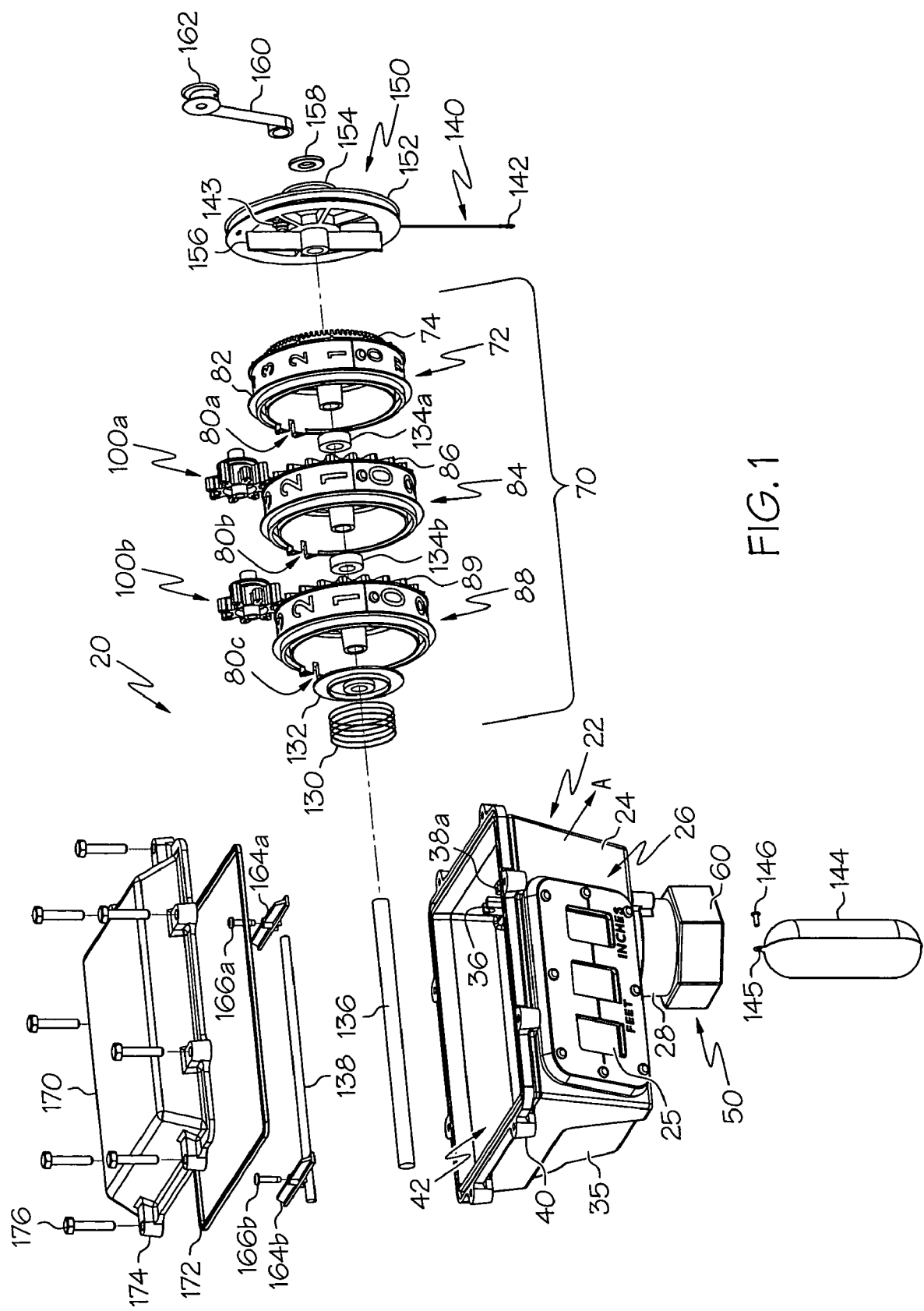
FIG. 1 is a partial exploded view of a fluid level measuring apparatus in accordance with one exemplary embodiment of the present invention.

FIG. 1 illustrates a partial exploded view of the fluid level measuring apparatus 20 in accordance with one exemplary embodiment of the present invention. The fluid level measuring apparatus 20 includes a housing 22 provided with a level indicator 70 therein adapted to display a measured fluid level. As shown in FIG. 10, an elongated flexible member 140 is attached to a float 144 wherein the float is adapted to travel along a float guide member 180 shown in FIG. 10 and as described more fully below.

In exemplary embodiments, the housing 22 includes an angled face 24 with a display window assembly 26 adapted to display the information in a direction toward an observer. When the apparatus 20 is used in connection with an above ground tank, the angled face 24 displays a measured fluid level in a direction "A", as shown in FIG. 1, such that the measurement information is displayed through one or more windows 25 of the display window assembly 26 and directed downwardly and outwardly from the housing 22 to a user observing from a lower position, i.e. the ground. It is understood that the angle of the front face will depend on the orientation of the user relative to the housing. For instance, the housing may be provided with a vertical front face in an application where the user observes the information directly to one side of the housing. Similarly, the housing can be provided with a front face directed upwardly and outwardly in an application where the user observes the information from above as would be the case with an apparatus used with an underground tank.

The housing 22 may be formed from any desirable material. In one embodiment, the housing 22 is formed from durable non-corrosive material, examples of which include, but are not limited to, plastic or metal, such as stainless steel or aluminum, or the like.

In a further embodiment, the housing 22 is rotatable with respect to the tank 202 about a vertical axis so that the windows 25 of the display window assembly 26 and the angled face 24, if included, may be positioned in any desired direction. In particular exemplary embodiments, the housing 22 has an infinitely adjustable rotation angle about the vertical axis of 360 degrees or more. For instance, as shown in FIG. 10, the angled face 24 is directed outwardly from a front side 213 of the tank 202. The housing 20, may also be rotated such that the angled face 24 faces either the right side 212, the left side 214, or rearwardly toward a rear side of the tank 202 depending on the location of an observer. Importantly, in this embodiment, rotation of the housing to accommodate the observation of fluid level information does not interfere with accurate measurement of fluid levels.

Exemplary apparatus disclosed throughout this application may include an optional mounting device 50. One particular optional mounting device 50 is adapted to attach to a tank opening 208 after a separate float guide member 180 is engaged with the tank opening 208 (see FIG. 11). As shown, the mounting device 50 may be rotatably attached to the housing 22 to facilitate rotatable adjustment of the apparatus 20 with respect to the tank 202. Therefore, the exemplary mounting device 50 may assist in connecting the apparatus 20 to the tank 202 while permitting relative rotation between the housing 22 and tank 202. Although not shown, further optional mounting devices may be integral with the housing and may be nonrotatable with respect thereto. For example, the mounting device can comprise a fitting portion that is an integral part of the housing.

Figure 3:
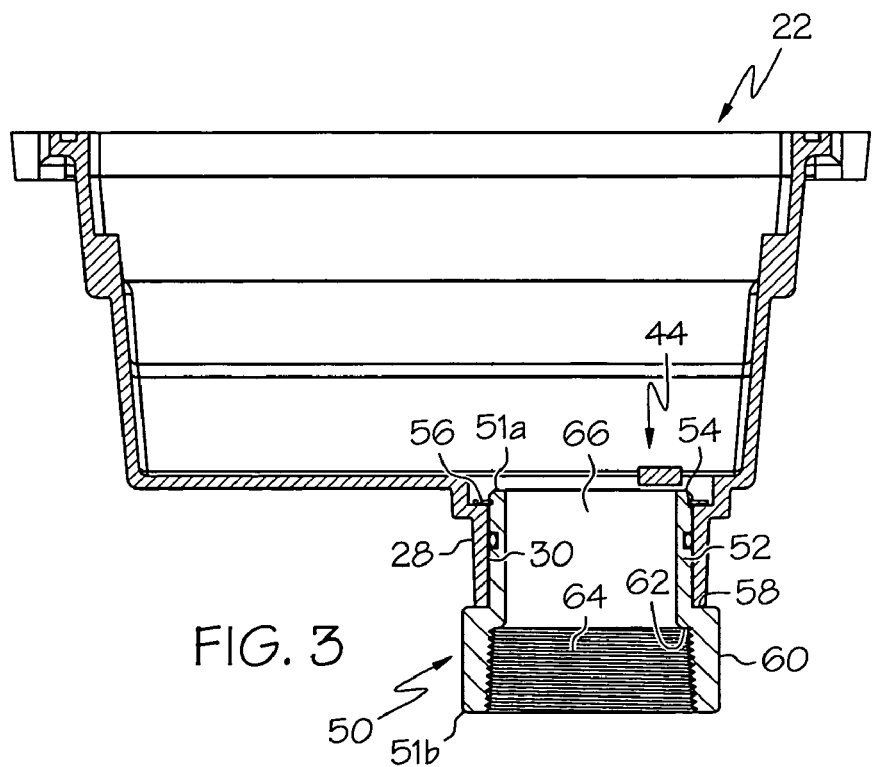
FIG. 3 is a sectional view of the components of FIG. 2 along line 3—3 of FIG. 2.

One exemplary embodiment of a mounting device 50 is depicted in FIG. 3. The exemplary mounting device 50 includes a first end 51a, a second end 51b, and a threaded portion 64 disposed adjacent the second end 51b of the mounting device 50. A portion of the mounting device, such as an interior shoulder 62, can be disposed between the threaded portion and the first end 51a of the mounting device 50. The mounting device 50 can further comprise an exterior shoulder 58 for supporting an end portion of a housing collar 28. The exemplary mounting device 50 also includes a mounting collar 52 disposed between the threaded portion 64 and the first end 51a. The mounting collar 52 is adapted to be received within an aperture 30 defined by a housing collar 28. A retaining ring 56 can be engaged within a groove 54 of the mounting device 50 to rotatably attach the mounting device 50 to the housing 22. As illustrated in FIGS. 1 and 3, an exterior surface portion 60 of the mounting device 50 may have a shape (e.g., a hexagonal shape) adapted for engagement by a conventional torquing tool, such as a wrench.

The mounting device 50 may be formed from any desirable material. In one embodiment, the mounting device 50 is formed from durable non-corrosive material, examples of which include, but are not limited to, polymers such as polyketones. For example, the mounting device 50 may be formed from Carilon® aliphatic polyketones, acetal resins, for example, those available under the Delrin® series from Dupont, polypropylene, or polyethylene, or may be formed of a metal, such as stainless steel or aluminum, or the like.

Figure 2:
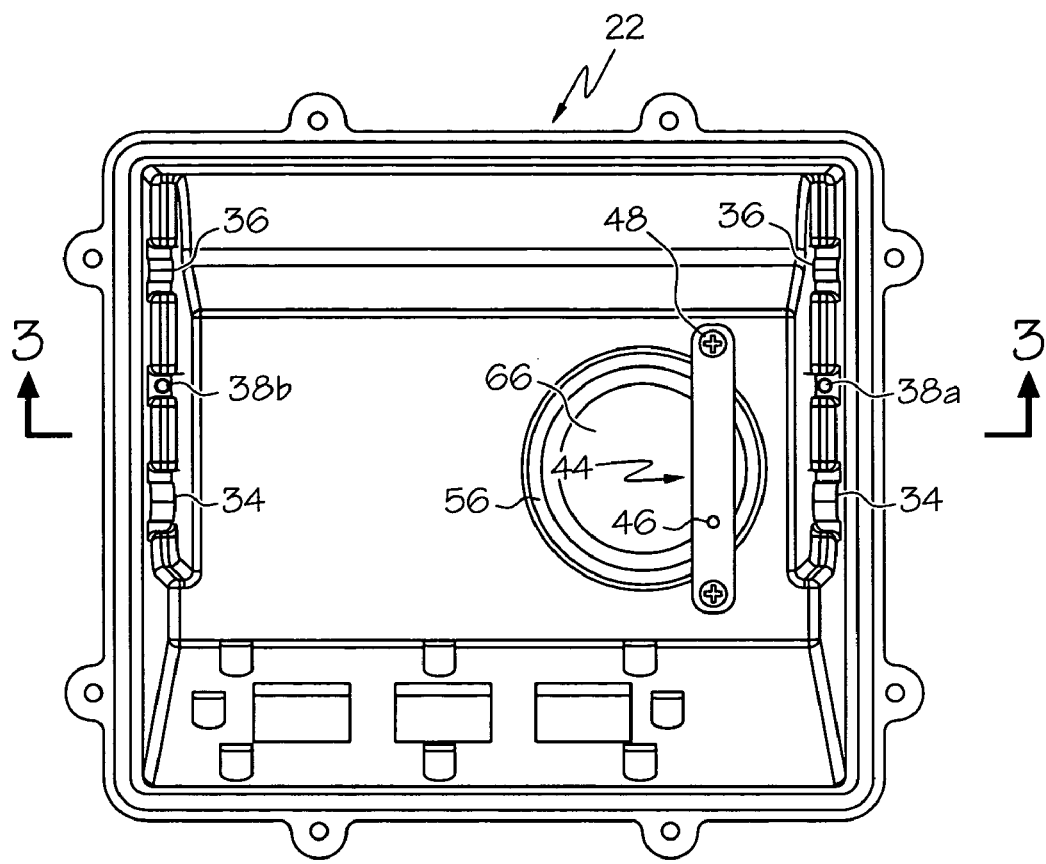
FIG. 2 is a top view of certain components of the apparatus of FIG. 1, wherein portions of the apparatus have been removed for illustrative purposes.
Figure 11:
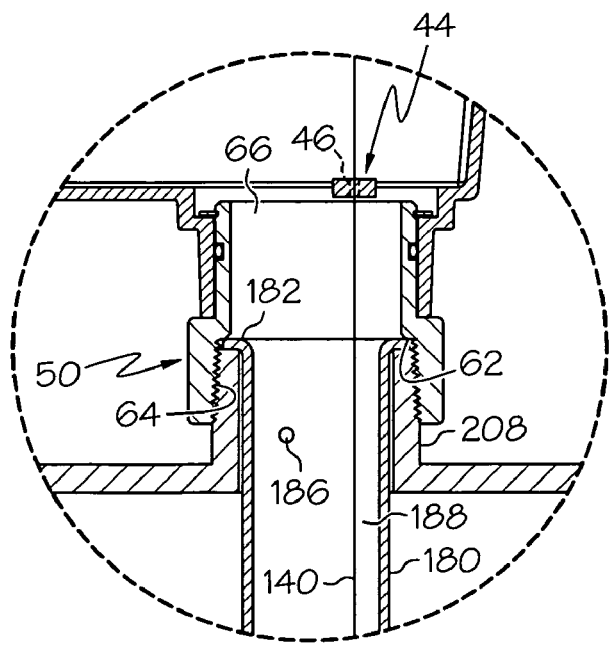
FIG. 11 is an enlarged sectional view of an exemplary connection between the apparatus and tank taken at view 11 of FIG. 10.

As shown in FIGS. 2 and 11, the exemplary mounting device 50, if provided, may further include an interior passageway 66. The elongated flexible member 140 is adapted to extend through an aperture 46 of a guide member 44 and a length of the elongated flexible member 140 is further adapted to extend through the interior passageway 66. The guide member 44 can comprise a length of material that spans above the interior passageway 66 and is fastened to the housing 22 adjacent each opposed end of the guide member 44 with one or more fasteners 48. The aperture 46 is adapted to position the elongated flexible member 140 such that it may be successfully received by a spool 152 when the float 144 travels towards the housing 22.

Figure 5:
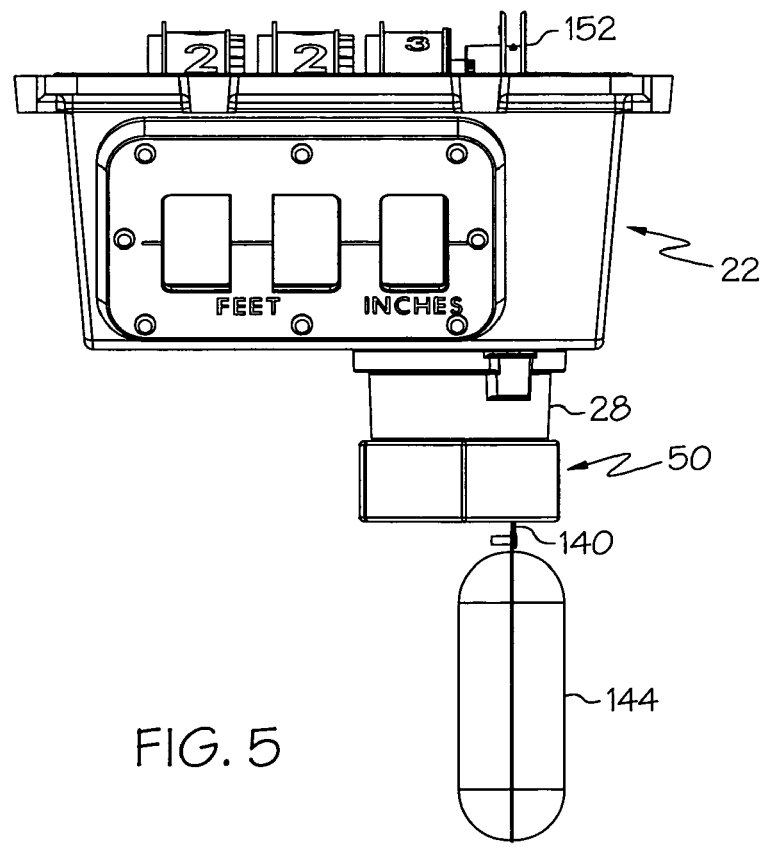
FIG. 5 is a front elevational view of the assembled apparatus of FIG. 4.
Figure 6:
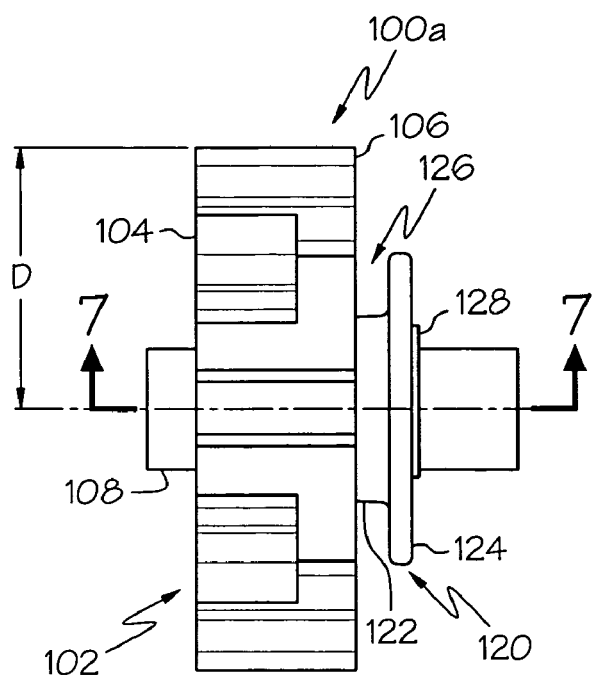
FIG. 6 is a front elevational view of an exemplary first indexing device.
Figure 7:
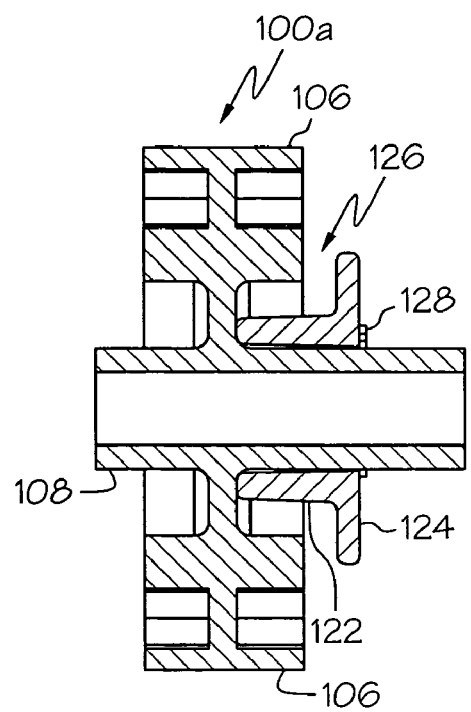
FIG. 7 is a sectional view of the first indexing device along line 7—7 of FIG. 6.
Figure 8:
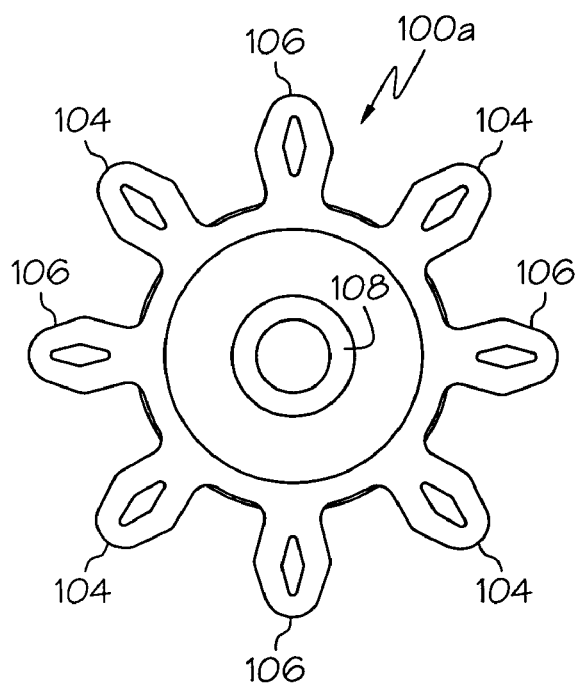
FIG. 8 is a left side view of the first indexing device of FIG. 6.
Figure 9:
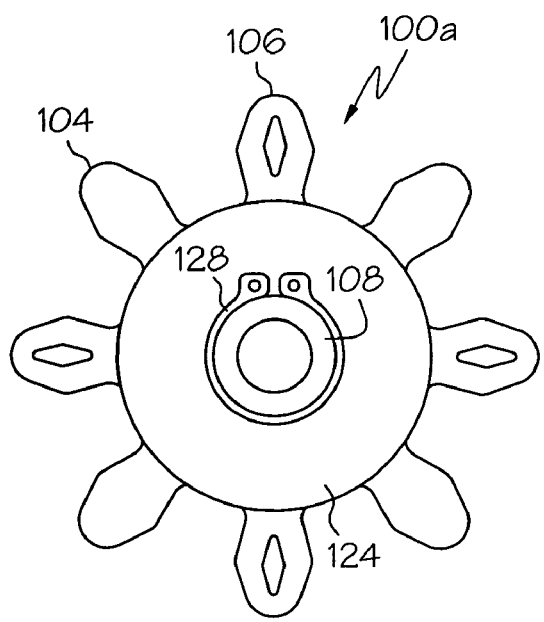
FIG. 9 is a right side view of the first indexing device of FIG. 6.

As shown in FIGS. 1, 5 and 10, a first end 142 of the elongated flexible member 140 is attached to the float 144 and, as shown in FIG. 10, the float 144 is adapted to travel along the float guide member 180. The float guide member 180 is best shown in FIGS. 10 and 11 and may be provided separate from the apparatus 20. The float guide member can comprise a variety of shapes. For example, the float guide member may comprise one or more of a rod, a telescoping member, a filament, an elongated member, or other member adapted to provide a guide for the float 144. The float may be adapted in a variety of alternative ways such that the float cooperates with the float guide member to define a travel path. For example, as illustrated in one exemplary embodiment of U.S. Pat. No. 6,523,404, the float may comprise a through hole wherein the float guide member extends through the through hole.

As illustrated in FIG. 10, one particular embodiment of the float guide member 180 comprises an elongated tube wherein the float 144 is adapted to travel within an interior passage 188 of the elongated tube. Locating the float 144 in an interior passage of an elongated tube may simplify installation of the apparatus 20 to the tank 202, particularly in embodiments where the float guide member 180 is provided separate from the apparatus 20. As shown, the elongated tube 180 may comprise a first end portion 182 adapted to engage an upper end portion of the tank opening 208 such that the float guide member 180 is suspended from the tank opening 208. The float guide member 180 can be sized such that a second end portion 184 of the float guide member 180 is spaced an offset distance (e.g., from about two inches to about three inches) from a bottom 216 of the tank 202. The offset distance permits fluid communication between a tank interior 210 and the interior passage 188 of the float guide member 180 such that the float 144 may sense a fluid level 204 and/or a change in the fluid level of a fluid 206 located within the tank interior 210.

The first end portion 182 of the float guide member 180 may comprise a variety of structures adapted to engage the tank opening 208. In one particular example, the first end portion 182 comprises a flanged or flared end to substantially and/or continuously engage a periphery of an upper terminus of the tank opening 208. Substantial and/or continuous engagement of the periphery may reduce the probability of structural failure by reducing material stress concentrations that might otherwise develop with a first end portion having nonsubstantial and/or noncontinuous engagement with the tank opening 208. The float guide member 180 may further comprise an aperture 186 to allow fluid communication between the interior passage 188 and the tank interior 210 to substantially reduce or prevent a pressure buildup from inhibiting the motion of the float 144 within the interior passage 188 of the float guide member 180.

As shown in FIG. 11, the previously-mentioned portion of the mounting device (e.g., the interior shoulder 62) may be positioned such that it traps the first end portion 182 of the float guide member 180 between the interior shoulder 62 and the tank opening 208. As shown, in one particular embodiment, the mounting device 50 is arranged such that it simultaneously engages the tank opening 208 and the first end portion 182 of the float guide member 180 while the first end portion 182 of the float guide member 180 engages the tank opening 208. Indeed, FIG. 11 shows the threads 64 of the mounting device 50 engaging threads of the tank opening 208, the interior shoulder 62 of the mounting device 50 engaging the first end portion 182 of the float guide member 180, and the first end portion 182 of the float guide member 180 engaging the upper end portion of the tank opening 208. Trapping the float guide member 180 may limit movement of the float guide member 180 with respect to the tank 202 and therefore improve reliability and consistency of the travel path for the float 144.

The float 144 includes a buoyant body that is adapted to maintain a position with respect to the fluid level 204 in the tank 202. As shown, the buoyant body is in the form of a hollow plastic or metal floatation device. In alternative examples, a closed cell buna-N foam or other buoyant material may be used that resists corrosion by the fluid to be measured. In the illustrated embodiment, the float 144 is adapted to cooperate with interior dimensions of the float guide member 180. The exemplary float 144 includes a circular cross section that is adapted to cooperate with a circular cross section of the interior passage 188 of the float guide member 180. Such cooperation increases measurement accuracy by facilitating axial movement while inhibiting radial movement of the float 144 with respect to the float guide member 180. Although not shown, limited relative rotational movement between the float and float guide member may also be desired to prevent or reduce twisting of the elongated flexible member. Such limited relative rotational movement may be achieved, for example, by a tongue-and-groove structure between the float and float guide member or by providing the float and float guide member with cooperating noncircular cross-sectional features.

The first end 142 of the elongated flexible member 140 may be attached to the float 144 by any suitable connector. The float 144, for example, may include an integral tab 145 that is adapted to receive a connector, such as a rivet 146, to attach the first end 142 of the elongated flexible member 140 to the float 144. The elongated flexible member 140 may be in the form of a filament, wire, cable, chain, or other flexible member.

The elongated flexible member 140 is adapted to extend from the float 144, at the first end 142, to the spool 152 located in an interior area 42 of the housing 22 at the opposite second end of the flexible member. As shown in FIG. 1, a fastening device 143 may be provided for attaching the second end of the elongated flexible member 140 to the spool 152. As shown, the spool 152 may be included as part of a storage device 150 that further includes an optional axial rib 156. The axial rib 156 is adapted to engage two opposed teeth of an axial tooth array 74 of a first level indicating gear 72 to provide a substantially rigid and reliable connection therebetween. Engagement between the axial rib 156 and the axial tooth array 74 provides coupling between the storage device 150 and the first level indicating gear 72 such that, when engaged, rotation of the storage device 150 will cause a corresponding rotation of the first level indicating gear 72. Moreover, the axial tooth array 74 may comprise a plurality of closely-spaced teeth arranged in a relatively large radius adjacent an outer periphery of the first level indicating gear 72 such that a fine incremental radial adjustment between the spool 152 and the first level indicating gear 72 may be obtained.

As shown in FIG. 1, the apparatus 20 includes a biasing member, such as a constant torsion spring 160, which urges or biases the spool 152 of the storage device 150 to uptake the excess length of the elongated flexible member 140 as the float 144 moves toward the housing 22. For example, the illustrated torsion spring 160 urges the spool 152 of the storage device 150 to automatically uptake portions or lengths of the elongated flexible member 140 as the float 144 travels towards the housing 22, but also allows the elongated flexible member 140 to unwind from the spool 152 as the float 144 travels away from the housing 22. The torsion spring 160 may be attached to a first spring storage spool 154 of the storage device 150 by any suitable fastener, such as a screw. Portions of the torsion spring 160 may also be partially coiled on a second spring storage spool 162. A bushing 158 may be provided to reduce the friction between the storage device 150 and the housing 22.

The level indicator 70 can comprise a mechanical or electrical device to translate the position of the float 144 along the float guide member 180 into measured fluid level information. For instance, the level indicator may include an electrical device with a digital readout using digital display technology known in the art. In the illustrated embodiment, the level indicator 70 includes a mechanical device including one or more gears or a plurality of gears in communication with the storage device 150. For example, the level indicator 70 may include the previously-mentioned first level indicating gear 72 in addition to a second level indicating gear 84 and a third level indicating gear 88 that cooperate with one another to display measured fluid level information. Each of the level indicating gears 72, 84 and 88 may include information associated therewith relating to fluid measurement units. For example, each level indicating gear 72, 84, 88 may be provided with a label bearing indicia relating to fluid measurement units. In one particular example, the first level indicating gear 72 can include indicia corresponding to a sub-unit of measurement, the second level indicating gear 84 can include indicia corresponding to a single digit of a unit of measurement, and the third level indicating gear 88 can include indicia corresponding to a tens digit of the unit of measurement. Hence, in one example, the second level indicating gear 84 and the third level indicating gear 88 provide a double digit readout (e.g., in feet or meters) while the first level indicating gear 72 can provide a sub-unit of measurement (e.g., in inches or centimeters).

Exemplary embodiments of the level indicator 70 can also include one or more indexing devices adapted to facilitate an incremental rotation of one of the level indicating gears based on a rotation of another of the level indicating gears. For instance, the level indicator may further include a first indexing device 100a adapted to facilitate an incremental rotation of the second level indicating gear 84 based on a rotation of the first level indicating gear 72. After a rotation (e.g., a one full rotation) of the first level indicating gear 72, a counter associated with the first level indicating gear causes a partial rotation of the first indexing device 100a. As shown, the counter may comprise a pair of indexing teeth 80a associated with or formed integrally with the first level indicating gear 72. As shown by the structural relationship in the drawings, and with reference to FIGS. 1 and 6–9, rotation of the first level indicating gear 72 will eventually cause one of a pair of indexing teeth 80a of the first level indicating gear 72 to contact one of a first array 104 of indexing teeth of the first indexing device 100a, thereby partially rotating the first indexing device 100a. One of a second array 106 of indexing teeth is then received between the pair of indexing teeth 80a such that further rotation of the first level indicating gear 72 further rotates the first indexing device 100a. As the first and second arrays 104, 106 of indexing teeth of the first indexing device 100a are engaged and/or adapted for engagement with indexing teeth 86 of the second level indicating gear 84, any above-described rotation of the first indexing device 100a causes an incremental rotation of the second level indicating gear 84.

The level indicator 70 can also include a second indexing device 100b that is identical to the first indexing device 100a. The second indexing device 100b is adapted to facilitate an incremental rotation of the third level indicating gear 88 based on a rotation of the second level indicating gear 84. After a rotation (e.g., a one full rotation) of the second level indicating gear 84, a counter associated with the second level indicating gear causes a partial rotation of the second indexing device 100b. Similar to the counter associated with the first level indicating gear 72, the counter associated with the second level indicating gear 84 may comprise a pair of indexing teeth 80b associated with or formed integrally with the second level indicating gear 84. Rotation of the second level indicating gear 84 will eventually cause one of the pair of teeth 80b to contact one of a first array of indexing teeth of the second indexing device 100b, thereby partially rotating the second indexing device 100b. One of a second array of indexing teeth is then received between the pair of indexing teeth 80b such that further rotation of the second level indicating gear 84 further rotates the second indexing device 100b. As the first and second arrays of indexing teeth of the second indexing device 100b are engaged and/or adapted for engagement with indexing teeth 89 of the third level indicating gear 88, any above-described rotation of the second indexing device 100b causes an incremental rotation of the third level indicating gear 88.

In order to reduce costs and simplify fabrication, the third leveling indicating gear 88 may also have a pair of non-functional indexing teeth 80c that do not engage a corresponding index gear (unless the level indicator is provided with yet another level indicating gear and corresponding indexing device). Hence, the same mold may be used to form a number of the gears. One skilled in the art will appreciate that the level indicator can include more or less than three level indicating gears depending on the particular application.

Figure 4:
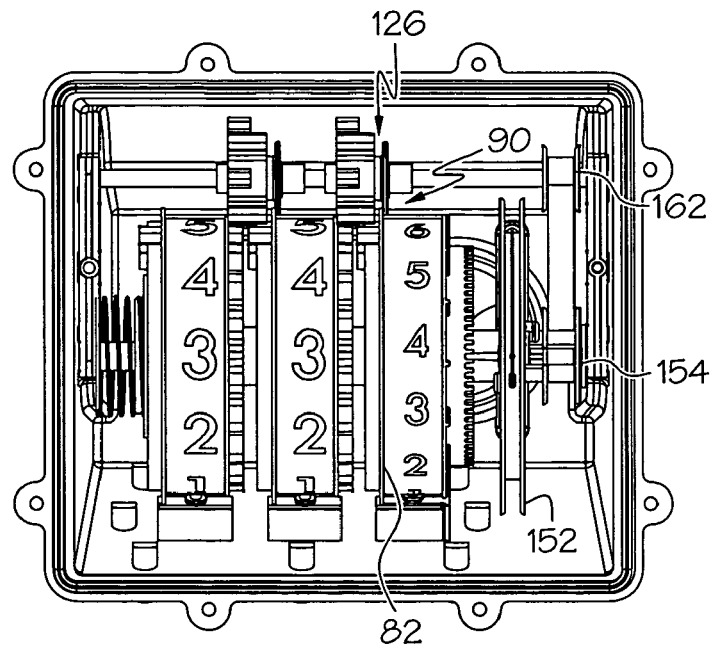
FIG. 4 is a top view of an assembled apparatus in accordance with FIG. 1 with the lid removed.

With further reference to FIGS. 1 and 4, the three level indicating gears 72, 84, 88 and the storage device 150 can be rotatably mounted within the interior area 42 of the housing 22 in any appropriate manner. In one embodiment, the level indicating gears 72, 84, 88 and storage device 150 are rotatably mounted on a first shaft 136. As shown in FIG. 2, a first pair of seats 34 may be defined by the housing 22 to rotatably receive each corresponding end of the first shaft 136. Once each end of the first shaft 136 is properly located in a corresponding seat of the first pair of seats 34, a corresponding first retaining bracket 164a is secured with a corresponding fastener, such as a screw 166a, at a corresponding first fastening location 38a. Similarly, a second retaining bracket 164b is secured with a corresponding fastener, such as a screw 166b, at a corresponding second fastening location 38b.

The first and second indexing devices 100a and 100b and the second spring storage spool 162 are similarly rotatably mounted within the interior area 42 of the housing 22 in any appropriate manner. For example, the first and second indexing gears 100a, 100b and the second spring storage spool 162 may be rotatably mounted on a second shaft 138 that can be offset and parallel to the first shaft 136. As further shown in FIG. 2, a second pair of seats 36 may be defined by the housing 22 to rotatably receive each corresponding end of the second shaft 138. Once each end of the second shaft 138 is properly located in a corresponding seat of the second pair of seats 36, the corresponding retaining brackets 164a, 164b are secured with fasteners 166a, 166b as described above. Thus, in the illustrated embodiment, the single retaining bracket 164a can be mounted with the single fastener 166a at a first fastening location 38a to simultaneously retain the first ends of the first shaft 136 and the second shaft 138 in the corresponding first of the pairs of seats 34, 36. Similarly, the single retaining bracket 164b can be mounted with the single fastener 166b at a second fastening location 38b to simultaneously retain the second ends of the first shaft 136 and the second shaft 138 in the corresponding second of the pairs of seats 34, 36. Providing a single retaining bracket and fastening location for a plurality of shaft ends reduces material costs and assembly time.

As described above, each of the shafts 136, 138 can be rotatable with respect to the housing and each of the components can be rotatable with respect to the respective shaft. Allowing the shafts to rotate relative to the seats and allowing the components to rotate relative to the respective shafts may reduce friction and/or reduce manufacturing costs in certain applications. Although not shown in the illustrated embodiments, the first and second shaft 136, 138 may optionally be provided with opposite keyed ends for nonrotatable mounting in correspondingly shaped keyed recesses while the components are adapted to rotate relative to a respective shaft. In still further embodiments, each of the components may have a keyed portion to nonrotatably mount to a respective shaft while each shaft is adapted for rotatable mounting with respect to the corresponding seat. Preventing relative rotation between elements may be desirable if the elements are prone to wear from dynamic interaction with one another.

A groove 35 may be formed in each side of the housing 22 to assist in providing the first pair of seats 34, the second pair of seats 36, and the mounting locations 38a, 38b. The grooves 35 help maintain a constant thickness of the housing 22 formed, for example by molding, and assists in the removal of the housing from the mold after formation.

First and second bushings 134a, 134b may be provided to reduce the friction between the level indicating gears 72, 84 and 88, and a biasing compression spring 130 may be provided to apply lateral pressure to a spring guide 132 which in turn biases the first gear 72, the second gear 84, the third gear 88, the spool device 150, the first indexing device 100a, and the second indexing device 100b together in a cooperating operational relationship.

The indexing devices 100a, 100b are identical to one another wherein details of the first indexing device 100a are described and illustrated with respect to FIGS. 6–9. Indexing devices in accordance with the present invention may be adapted to interact with a corresponding level indicating gear to substantially prevent movement of the indexing device away from the corresponding level indicating gear. For example, the first indexing device 100a can include a groove 126 defined between a portion of an indexing gear 102 and a portion of an alignment device 120. As shown on FIGS. 6 and 7, the alignment device 120 comprises a member including a collar 122 and a radial flange 124. The collar 122 is adapted to be received over a hub 108 of the indexing gear 102. As shown, a retaining ring 128 is adapted to limit or prevent relative axial movement between the alignment device 120 and the indexing gear 102. In exemplary embodiments, the alignment device 120 is rotatable with respect to the indexing gear 102.

As shown in FIG. 4, a tongue-and-groove structure 90 can be formed to limit axial movement between the indexing device and the corresponding level indicating gear. For example, the tongue-and-groove structure 90 can include a tongue 82 from a corresponding level indicating gear that is received within the groove 126 defined by the first indexing device 100a to substantially prevent movement of the first indexing device 100a away from the corresponding level indicating gear. As shown in FIG. 4, the corresponding level indicating gear comprises the first level indicating gear 72. However, it is understood that the corresponding level indicating gear may comprise the second level indicating gear 84 such that the first indexing device 100a is coupled with the second level indicating gear 84 rather than the first level indicating gear 72. Substantially preventing movement of the first indexing device 100a away from one of the first or second level indicating gears helps maintain relative alignment between the indexing device and the corresponding level indicating gear. Moreover, the alignment device 120 may be rotatably mounted to the indexing gear 102 to reduce friction between interacting elements of the tongue-and-groove structure. Although not shown, it is understood that alternative embodiments may further include the groove being defined by the corresponding level indicating gear while the tongue is defined by the indexing device.

The second indexing device 100b may also be provided to include structure that is identical to the first indexing device 100a. The second indexing device 100b is adapted to interact with a corresponding level indicating gear comprising one of the second level indicating gear 84 and the third level indicating gear 88 to substantially prevent movement of the second indexing device 100b away from the corresponding level indicating gear. As with the first indexing device 100a, a tongue-and-groove structure may be provided to substantially prevent movement of the second indexing device 100b away from the second corresponding level indicating gear. The second corresponding level indicating gear is shown as comprising the second level indicating gear 84. Although not shown, it is understood that the second corresponding level indicating gear may alternatively comprise the third level indicating gear 88. Moreover, it is possible for the second level indicating gear 84 to serve as both the first and second corresponding level indicating gears such that the first indexing device 100a and the second indexing device 100b are both coupled with respect to the second level indicating gear 84 to substantially prevent each of the indexing devices 100a, 100b from moving away from the second level indicating gear 84.

The housing 22 may optionally be provided with a removable lid 170 to provide access to the interior area 42 of the housing 22 to facilitate calibration, cleaning, or other maintenance. The lid 170 may include a plurality of fastening tabs 174 that correspond with fastening tabs 40 disposed on the housing 22.

One or more fasteners 176 may engage corresponding tabs 40, 174 to facilitate a vapor-tight connection. A gasket 172 may be used in combination with the lid 170 to prevent vapor leakage and to protect the interior of the housing 22 from contamination. Although not shown, the lid 170 may alternatively have a snapping connection to the remainder of the housing 22 to allow toolless entry to the interior of the housing 22.

One of ordinary skill will appreciate that while various seals have been described herein, all rivets, screws, or other fasteners used in the housing should be sealed with a gasket or otherwise in order to prevent vapor leakage and contamination. For various practical applications, it is also preferable that the housing be capable of holding about 50 psi above ground.

Although not shown, the housing may include a valve adapted to prevent over and underpressurization of the tank. Such a valve would permit air to enter the housing below a predetermined underpressurization level and would further allow exiting of fluid from the tank through the housing above a predetermined overpressurization level. Accordingly, the valve may prevent damage to the tank that might cause an environmental concern while also minimizing venting of fluid (e.g., vapor) from the tank that would otherwise occur with an unregulated vent opening. In one example, a valve similar to the valve illustrated in FIG. 14 of U.S. Pat. No. 6,523,404 may be incorporated with the concepts of the present invention.

The spool 152 may also be arranged within the interior area 42 of the housing 22 in order to minimize jumping of the elongated flexible member 140 out of the spool 152 as the spool 152 rotates. For example, the spool 152 may be arranged such that an upper portion of the spool 152 (see FIG. 5) extends substantially above the upper edge of the housing 22. After installation of the lid 170, the clearance between the lid and spool 152 is minimal, thereby reducing the possible area for the elongated flexible member to jump out of the spool 152 as the spool rotates. Alternatively, a limiting member, separate from the housing lid, may be included to inhibit jumping of the elongated flexible member 140 at the top of the spool 152. A lower portion of the spool 152 may also be arranged adjacent the guide member 44 to similarly inhibit jumping of the elongated flexible member out of the spool 152 as the spool rotates. Therefore, positioning of the spool 152 within the interior area 42 of the housing 22 can assist in maintaining the position of the elongated flexible member 140 with respect to the spool 152 as the spool rotates, thereby reducing the likelihood of a tangled nesting of the elongated flexible member 140 as it jumps over the side edges of the spool.

Exemplary methods of installing an apparatus 20 and a float guide member 180 to a tank 202 will now be described with reference to FIGS. 10–12. It will be appreciated that the apparatus 20 may be provided separately from the float guide member 180 and may in fact be sold separately therefrom such that the installer may purchase the float guide member 180 separately from the apparatus 20 for later custom installation with a tank 202.

Figure 12:
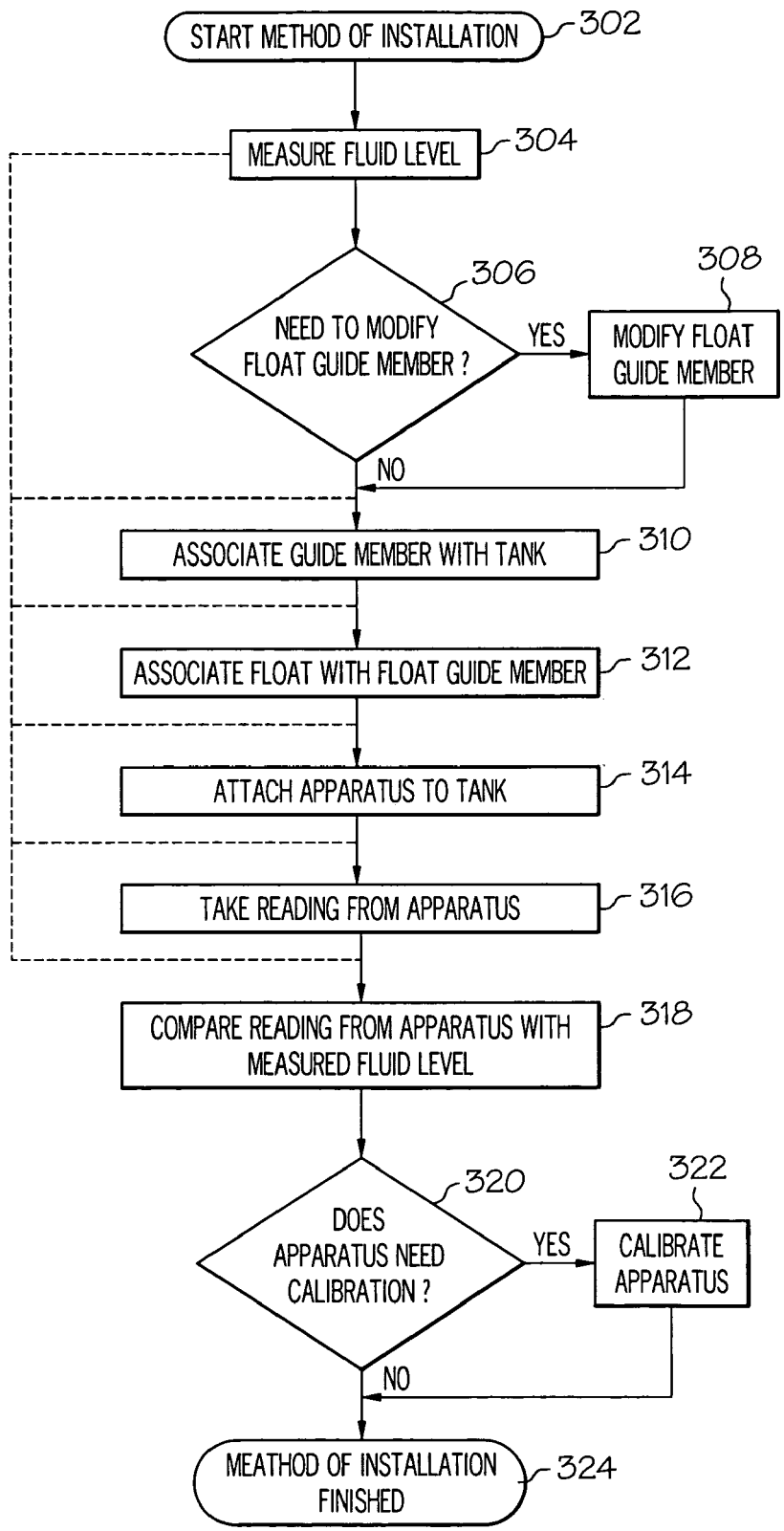
FIG. 12 is a flow diagram of exemplary methods of installing an apparatus to a tank in accordance with the present invention.

As shown on FIG. 12, the method of installation begins at step 302, wherein the installer starts the method of installing the apparatus for measuring a fluid level and a float guide member to a tank. At step 304, the installer may measure a fluid level for later calibration of the apparatus 20. For example, the measurement may be taken by a conventional method (e.g., with a dip stick). As shown by the broken lines in FIG. 12, the step 304 of measuring a fluid level is optional and may also occur at various points during the method of installation.

The installer may further investigate whether the float guide member 180 needs to be modified at step 306. This investigation may be conducted by taking measurements of the float guide member 180 to determine whether it is appropriately sized for the tank 202. The installer may also determine whether a portion, such as a flared portion, needs to be added to the first end portion 182 of the float guide member 180. Still further, the installer may investigate whether an appropriate aperture 186 or other pressure equalization mechanism is necessary or already present. This step may be particularly important if the float guide member 180 is purchased separately from the apparatus 20 where the float guide member 180 comprises stock material that will be modified by the installer depending on the particular application.

After making the inquiry at step 306, the installer may modify the float guide member 180 at step 308, if necessary, prior to associating the float guide member 180 with the tank 202 at step 310. If the installer determines that the length of the float guide member is too long, the installer may cut the float guide member to obtain a custom installation to the tank 202. If necessary, a pipe cutter may be used to cut one end of the float guide member 180 such that a lower end 184 of the float guide member 180 is adapted to be suspended above a lower surface 216 of the tank, for example, by about 2–3 inches. If the installer determines that the first end portion 182 of the float guide member 180 should be modified to engage the tank opening 208, the installer may provide such modification, for example, by flaring the first end portion 182. In addition, if the installer determines that there is a need to provide a pressure equalization mechanism, the installer might drill or otherwise provide an aperture 186 in the float guide member 180.

During step 310, the float guide member 180 is associated with the tank 202 after step 306 (if no modification is necessary) or after step 308 (if a modification is necessary). For example, during the step 310, the second end portion 184 of the float guide member 180 is first inserted through the tank opening 208 and into the tank interior 210 until the first end portion 182 of the float guide member 180 engages the tank opening 208. Thereafter, the float guide member 180 may be suspended within the tank interior 210 while the first end portion 182 engages the tank opening 208.

During step 312, the float 144 is associated with the float guide member 180. For example, in applications where the float guide member 180 comprises a tube, the float 144 might be associated with the float guide member 180 by inserting the float 144 within the interior passage 188 of the float guide member 180. If desired, the float 144 is then dropped with respect to the float guide member 180 until the float 144 obtains an orientation with respect to the fluid level 204 based on the buoyancy of the float 144. Once associated, the float guide member 180 assists in defining a float guide path for the float 144.

During step 314, the apparatus 20 is attached to the tank 202. In one example, the mounting device 50 may be positioned relative to the tank opening 208 after which the mounting device 50 may be rotated relative to the tank opening 208 such that the threaded portion 64 of the mounting device 50 engages exterior threads of the tank opening 208. Continued rotation of the mounting device 50 eventually causes the interior shoulder 62 to trap the first end portion 182 with respect to the upper end of the tank opening 208; thereby limiting relative movement of the float guide member 180 with respect to the tank 202. In one particular example, the first end portion 182 may be trapped by engaging the interior shoulder 62 with the first end portion 182. For instance, the shoulder 62 may compress the first end portion 182 against the upper end of the tank opening 208 to provide enhanced attachment and further limit movement of the float guide member 180 with respect to the tank 202. A tool, such as a wrench, may be used to engage the exterior surface portion 60 of the mounting device 50 to assist in attaching the apparatus 20 to the tank 202. Therefore, the mounting device 50 may assist in attaching the apparatus 20 to the tank opening 208 while substantially limiting movement of the float guide member 180 with respect to the tank 202 in certain applications.

Once the apparatus has been attached to the tank 202, the float 144 assumes a position with respect to the float guide member 180 corresponding to the fluid level 204 in the tank 202. The biasing member 160 urges the spool 152 to rotate in order to automatically uptake portions of the elongated flexible member 140. The spool 152 communicates with the level indicator 70 as the spool 152 rotates to uptake portions of the elongated flexible member 140. Once an equilibrium is reached, the installer may take a reading of the apparatus during step 316.

During step 318, the installer then compares the reading taken during step 316 with the actual fluid level measured during step 304. Based on the comparison, the installer will decide whether calibration of the apparatus is needed during step 320. If no calibration is necessary, then the method of installation is completed at step 324. However, if there is a substantial difference between the actual fluid level measured at step 304 and the reading taken from step 316, the installer may chose to perform a calibration step at step 322.

During calibration, the installer may remove the lid 170 and adjust the orientation of one or more of the level indicating gears 172, 184 and 188 to properly display the actual fluid level determined during step 304. Adjustment of the orientation of the level indicating gears may be achieved, for example, by laterally moving a selected one of the three level indicating gears 72, 84, 88 against the force of the biasing compression spring 130 to disengage the selected gear from communication with the spool 152. The selected gear is then rotated to display the appropriate indicia representing the actual fluid level. The process is repeated for the remaining gears until the actual fluid level is displayed.

After removing the lid 170 and when looking down on the labels from above, the numbers may be different from the numbers actually displayed through the windows 25. A conversion table may be provided in a booklet or otherwise printed on the housing 22 (e.g., on the lid 170 of the housing) for determining which number is displayed in the window corresponding to the number viewed from above.

Once calibrated, the lid 170 is closed such that the lid 170 and gasket 172 prevent and/or inhibit vapor release and/or contamination. In rotatable applications, the housing 22 may also be rotated about a vertical axis such that the angled face 24 is directed towards the frequent location of an observer. The friction of the connection between the housing 22 and the mounting device 50 may be sufficient to maintain the orientation of the housing 22 at its desired location. Although not shown, set screws may be provided to assist in maintaining the orientation of the housing at its desired location.

After the initial installation, the apparatus 20 will automatically display the current fluid level 204 in the tank 202. For instance, as the fluid 206 is removed from the tank 202, the fluid level 204 decreases, thereby causing the float 144 to move downwardly with respect to the float guide member 180 and away from the housing 22 and the level indicator 70. As the tank 202 is emptied, the float 144 continues to move downwardly, thereby causing the elongated flexible member 140 to unwind from the spool 152 as the spool 152 rotates.

The rotation of the spool is communicated to the level indicator 70 which translates the spool rotation to display the current measured fluid level 204 according to the location of the float 144 with respect to the float guide member 180. Hence, the level indicator 70 automatically displays the measured fluid level 204 by continuously adjusting the displayed indicia as the fluid level 204 changes.

Similarly, as the tank 202 is filled, the fluid level 204 increases, thereby causing the float 144 to move upwardly with respect to the float guide member 180 toward the housing. The float 144 can continue to move upwardly as the fluid level 204 increases until the float 144 abuts portions of the apparatus. Although not shown, it is appreciated that an alarm system may be provided, similar to that disclosed by U.S. Pat. No. 6,523,404, for indicating a maximum fluid level in the tank. While the float 144 is moving upwardly, the spool 152 automatically uptakes unused portions or lengths of the elongated flexible member 140, thereby causing the spool 152 to rotate. The rotation of the spool is communicated to the level indicator 70 which translates the spool rotation to display the current measured fluid level 204 according to the location of the float 144 in the tank 202.

Having shown and described exemplary embodiments of the present invention, further adaptations of the methods and apparatus described herein can be accomplished by appropriate modifications by one of ordinary skill in the art without departing from the scope of the present invention. Several of such potential modifications have been mentioned, and others will be apparent to those skilled in the art. For example, various structures, features (e.g., types of materials) and/or combinations thereof that are disclosed by U.S. Pat. No. 6,523,404 to Murphy et al. may be substituted for or used in addition to the concepts described herein. Accordingly, the scope of the present invention should be considered in terms of the following claims and is understood not to be limited to the exemplary details of structure and operation shown and described in the specification and drawings.

What is claimed is:

1. An apparatus for measuring a fluid level in a tank with a tank opening and a float guide member adapted to engage a tank opening, the apparatus comprising:
    a) a housing including a level indicator adapted to display a measured fluid level;
    b) a float associated with the level indicator;
    c) an elongated flexible member having a first end and a second end, wherein the first end is attached to the float;
    d) a spool adapted to store at least a portion of the elongated flexible member, the second end of the elongated flexible member being attached to the spool;
    e) a biasing member adapted to urge the spool to automatically uptake portions of the elongated flexible member as the float travels towards the housing and adapted to allow the elongated flexible member to unwind from the spool as the float travels away from the housing; and
    f) a mounting device attached to the housing and including an interior passageway, wherein a length of the elongated flexible member is adapted to extend through the interior passageway, and wherein the mounting device is adapted to attach to a portion of a tank adjacent a tank opening after a separate float guide member is separately engaged with the portion of the tank adjacent the tank opening.

2. The apparatus of claim 1, wherein the mounting device is adapted to trap a first end portion of a float guide member between a portion of the mounting device and the portion of the tank adjacent the tank opening.

3. The apparatus of claim 2, wherein the portion of the mounting device includes an interior shoulder.

4. The apparatus of claim 2, wherein the mounting device includes a threaded portion and an interior shoulder, wherein the threaded portion is adapted to engage the portion of the tank adjacent the tank opening and the interior shoulder is adapted to engage a first end portion of a float guide member.

5. The apparatus of claim 2, wherein the mounting device is adapted to simultaneously engage a first end portion of a float guide member and the portion of the tank adjacent the tank opening while a first end portion of the float guide member engages the portion of the tank adjacent the tank opening.

6. The apparatus of claim 1, wherein the mounting device is rotatably attached to the housing.

7. The apparatus of claim 1, wherein the mounting device includes a first end, a second end, a threaded portion disposed adjacent the second end of the mounting device, and an interior shoulder disposed between the threaded portion and the first end of the mounting device, wherein the mounting device is rotatably attached to the housing.

8. The apparatus of claim 1, wherein the level indicator includes a first level indicating gear, a second level indicating gear, and a first indexing device adapted to facilitate an incremental rotation of the second level indicating gear based on a rotation of the first level indicating gear, wherein the first indexing device is adapted to interact with a first corresponding level indicating gear comprising one of the first level indicating gear and the second level indicating gear to substantially prevent movement of the first indexing device away from the first corresponding level indicating gear.

9. The apparatus of claim 8, wherein the first indexing device and the first corresponding level indicating gear define a tongue-and-groove structure adapted to substantially prevent movement of the first indexing device away from the first corresponding level indicating gear.

10. A tank assembly comprising:
  a) a tank with a tank opening and a tank interior in communication with the tank opening;
  b) a float guide member comprising a first end portion engaging a portion of the tank adjacent the tank opening and a second end portion positioned within the tank interior; and
  c) an apparatus for measuring a fluid level comprising:
    i) a housing including a level indicator adapted to display a measured fluid level;
    ii) a float associated with the level indicator;
    iii) an elongated flexible member having a first end and a second end, wherein the first end is attached to the float;
    iv) a spool adapted to store at least a portion of the elongated flexible member, the second end of the elongated flexible member being attached to the spool;
    v) a biasing member adapted to urge the spool to automatically uptake portions of the elongated flexible member as the float travels towards the housing and adapted to allow the elongated flexible member to unwind from the spool as the float travels away from the housing; and
    vi) a mounting device attached to the housing and including an interior passageway, wherein a length of the elongated flexible member is adapted to extend through the interior passageway, and wherein the mounting device is attached to the portion of the tank adjacent the tank opening.

11. The tank assembly of claim 10, wherein the mounting device traps the first end portion of the float guide member between a portion of the mounting device and the portion of the tank adjacent the tank opening.

12. The tank assembly of claim 11, wherein the portion of the mounting device includes an interior shoulder.

13. The tank assembly of claim 11, wherein the mounting device simultaneously engages the first end portion of the float guide member and the portion of the tank adjacent the tank opening while the first end portion of the float guide member engages the portion of the tank adjacent the tank opening.

14. The tank assembly of claim 10, wherein the mounting device includes a threaded portion and an interior shoulder, wherein the threaded portion engages the portion of the tank adjacent the tank opening and the interior shoulder engages the first end portion of the float guide member.

15. The tank assembly of claim 10, wherein the mounting device includes a first end, a second end, a threaded portion disposed adjacent the second end of the mounting device, and an interior shoulder disposed between the threaded portion and the first end of the mounting device, wherein the mounting device is rotatably attached to the housing.

16. The tank assembly of claim 10, wherein the level indicator includes a first level indicating gear, a second level indicating gear, and a first indexing device adapted to facilitate an incremental rotation of the second level indicating gear based on a rotation of the first level indicating gear, wherein the first indexing device is adapted to interact with a first corresponding level indicating gear comprising one of the first level indicating gear and the second level indicating gear to substantially prevent movement of the first indexing device away from the first corresponding level indicating gear.

17. The tank assembly of claim 16, wherein the first indexing device and the first corresponding level indicating gear define a tongue-and-groove structure adapted to substantially prevent movement of the first corresponding indexing device away from the first corresponding level indicating gear.

18. The tank assembly of claim 10, wherein the float guide member comprises an elongated tube.

19. The tank assembly of claim 10, wherein the mounting device is rotatably attached to the housing.

20. An apparatus for measuring a fluid level in a tank comprising:
  a) housing including a level indicator adapted to display a measured fluid level, the level indicator including a first level indicating gear, a second level indicating gear, and a first indexing device adapted to facilitate an incremental rotation of the second level indicating gear based on a rotation of the first level indicating gear, wherein the first indexing device is adapted to interact with a first corresponding level indicating gear comprising one of the first level indicating gear and the second level indicating gear, wherein the first indexing device and the first corresponding level indicating gear define a tongue-and-groove structure adapted to substantially prevent movement of the first indexing device away from the first corresponding level indicating gear;
  b) a float associated with the level indicator;
  c) an elongated flexible member having a first end and a second end, wherein the first end is attached to the float;
  d) a spool adapted to store at least a portion of the elongated flexible member, and the second end of the elongated flexible member being attached to the spool; and e) a biasing member adapted to urge the spool to automatically uptake portions of the elongated flexible member as the float travels towards the housing and adapted to allow the elongated flexible member to unwind from the spool as the float travels away from the housing.

21. The apparatus of claim 20, wherein the first indexing device is provided with a groove and the first corresponding level indicating gear comprises a tongue, wherein a portion of the tongue extends into a portion of the groove.

22. The apparatus of claim 20, wherein the first indexing device comprises an indexing gear and an alignment device, wherein the groove is defined between a portion of the indexing gear and a portion of the alignment device.

23. The apparatus of claim 22, wherein the indexing gear and the alignment device are mounted with respect to the housing for relative rotation with respect to one another.

24. The apparatus of claim 20, wherein the first corresponding level indicating gear comprises the first level indicating gear.

25. The apparatus of claim 20, wherein the level indicator further comprises a third level indicating gear and a second indexing device adapted to facilitate an incremental rotation of the third level indicating gear based on a rotation of the second level indicating gear, wherein the second indexing device is adapted to interact with a second corresponding level indicating gear comprising one of the second level indicating gear and the third level indicating gear to substantially prevent movement of the second indexing device away from the second corresponding level indicating gear.

26. The apparatus of claim 25, wherein the second corresponding level indicating gear comprises the second level indicating gear.

27. A method of installing an apparatus for measuring a fluid level and a float guide member to a tank, the tank including a tank interior and a tank opening in communication with the tank interior, the float guide member including a first end portion and a second end portion, and the apparatus including: i) a housing with a level indicator adapted to display a measured fluid level, ii) a float associated with the level indicator, iii) an elongated flexible member having a first end and a second end, wherein the first end is attached to the float, iv) a spool adapted to store at least a portion of the elongated flexible member, the second end of the elongated flexible member being attached to the spool, v) a biasing member adapted to urge the spool to automatically uptake portions of the elongated flexible member as the float travels towards the housing and adapted to allow the elongated flexible member to unwind from the spool as the float travels away from the housing, and vi) a mounting device attached to the housing and including an interior passageway, wherein a length of the elongated flexible member is adapted to extend through the interior passageway, wherein the method comprises the steps of:
a) inserting the second end portion of the float guide member through the tank opening and into the tank interior until the first end portion of the float guide member engages a portion of the tank adjacent the tank opening;
b) associating the float with the float guide member; and
c) attaching the mounting device of the apparatus to the portion of the tank adjacent the tank opening after the first end portion of the float guide member is engaged with the portion of the tank adjacent the tank opening.

28. The method of claim 27, wherein the mounting device traps the first end portion of the float guide member between a portion of the mounting device and the portion of the tank adjacent the tank opening.

29. The method of claim 28, wherein the portion of the mounting device includes an interior shoulder.

30. The method of claim 28, wherein the step of attaching the apparatus to the tank includes positioning the mounting device such that it simultaneously engages the first end portion of the float guide member and the portion of the tank adjacent the tank opening while the first end portion of the float guide member engages the tank opening.

31. The method of claim 27, wherein the mounting device includes a threaded portion and an interior shoulder, and wherein the step of attaching the apparatus to the tank includes threading the mounting device to the tank opening such that the interior shoulder of the mounting device traps the first end portion of the float guide member between the portion of the mounting device and the portion of the tank adjacent the tank opening.

32. The method of claim 27, further comprising the step of calibrating the apparatus.

33. The method of claim 27, further comprising the step of modifying the float guide member prior to the step of inserting the portion of the float guide member through the tank opening.

34. The method of claim 33, wherein the step of modifying the float guide member comprises shortening a length of the float guide member.

35. The method of claim 27, wherein the float guide member comprises an elongated tube with an interior passage and wherein the step of associating the float with the float guide member comprises the step of inserting the float into the interior passage of the tube.

* * * * *

UNITED STATES PATENT AND TRADEMARK OFFICE
CERTIFICATE OF CORRECTION

PATENT NO. : 7,174,784 B2  Page 1 of 1
APPLICATION NO. : 10/757812
DATED : February 13, 2007
INVENTOR(S) : Brandon P. Grote et al.

It is certified that error appears in the above-identified patent and that said Letters Patent is hereby corrected as shown below:

Claim 20, column 16, line 47, change "housing" to --a housing--.

Signed and Sealed this

Twenty-sixth Day of June, 2007

JON W. DUDAS
*Director of the United States Patent and Trademark Office*